United States Patent
Bourdon et al.

(10) Patent No.: US 8,527,741 B2
(45) Date of Patent: *Sep. 3, 2013

(54) SYSTEM FOR SELECTIVELY SYNCHRONIZING HIGH-ASSURANCE SOFTWARE TASKS ON MULTIPLE PROCESSORS AT A SOFTWARE ROUTINE LEVEL

(75) Inventors: Albert J. Bourdon, Solana Beach, CA (US); Gary G. Christensen, Vista, CA (US); Michael J. Godfrey, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 313 days.

This patent is subject to a terminal disclaimer.

(21) Appl. No.: 11/428,508

(22) Filed: Jul. 3, 2006

(65) Prior Publication Data

US 2007/0113224 A1    May 17, 2007

Related U.S. Application Data

(60) Provisional application No. 60/697,071, filed on Jul. 5, 2005, provisional application No. 60/697,072, filed on Jul. 5, 2005.

(51) Int. Cl.
  *G06F 9/40* (2006.01)
  *G06F 11/14* (2006.01)

(52) U.S. Cl.
  USPC .......................................... 712/220; 712/229

(58) Field of Classification Search
  USPC ............... 712/15, 43, 220, 227, 229; 714/11, 714/12, 797
  See application file for complete search history.

(56) References Cited

U.S. PATENT DOCUMENTS 5,249,188 A * 9/1993 McDonald ...................... 714/53
5,255,367 A   10/1993 Bruckert et al.

(Continued)

FOREIGN PATENT DOCUMENTS

| EP | 0674262 A | 9/1995 |
|---|---|---|
| GB | 2399426 A | 9/2004 |
| WO | WO 2007/006011 A2 | 1/2007 |
| WO | WO 2007/006013 A2 | 1/2007 |

OTHER PUBLICATIONS

Deconnick, Geert et al., "The EFTOS Approach to dependability in embedded supercomputing," IEEE Transactions on Reality, Mar. 2002, vol. 51, Issue 1, p. 76-90, Posted online Sep. 7, 2002 at: http://www.esat.kuleuven.be/electa/publications/fulltexts/pub_884.pdf.

(Continued)

*Primary Examiner* — David J Huisman
(74) *Attorney, Agent, or Firm* — Kilpatrick Townsend & Stockton LLP (57) ABSTRACT

A task matching circuit for synchronizing software on a plurality of processors is disclosed. The task matching circuit includes first and second inputs, an analysis sub-circuit, and an output. The first input is from a first processor configured to receive a first software routine identifier. The second input is from a second processor configured to receive a second software routine identifier. The analysis sub-circuit determines if the first software routine identifier corresponds with the second software routine identifier. The output is coupled to at least one of the first or second processors and indicates when the first and second software routine identifiers do not correspond. One of the first and second processors is delayed until the first and second software routine identifiers correspond.

19 Claims, 7 Drawing Sheets

(56) References Cited

U.S. PATENT DOCUMENTS

| | | | |
|---|---|---|---|
| 5,751,932 A * | 5/1998 | Horst et al. | 714/12 |
| 5,845,060 A * | 12/1998 | Vrba et al. | 714/12 |
| 5,896,523 A * | 4/1999 | Bissett et al. | 713/400 |
| 6,065,135 A * | 5/2000 | Marshall et al. | 714/11 |
| 6,067,633 A | 5/2000 | Robbins et al. | |
| 6,101,255 A | 8/2000 | Harrison et al. | |
| 6,178,244 B1 | 1/2001 | Takeda et al. | |
| 6,226,742 B1 | 5/2001 | Jakubowski et al. | |
| 6,279,119 B1 | 8/2001 | Bissett et al. | |
| 6,356,795 B1 * | 3/2002 | Barthel et al. | 700/82 |
| 6,363,453 B1 * | 3/2002 | Esposito et al. | 711/2 |
| 6,363,464 B1 | 3/2002 | Mangione | |
| 6,434,712 B1 * | 8/2002 | Urban et al. | 714/12 |
| 6,665,700 B1 | 12/2003 | Sugisaki et al. | |
| 7,107,484 B2 * | 9/2006 | Yamazaki et al. | 714/12 |
| 7,802,075 B2 | 9/2010 | Bourdon et al. | |
| 2001/0044912 A1 | 11/2001 | Francis et al. | |
| 2003/0039354 A1 | 2/2003 | Kimble et al. | |
| 2003/0140255 A1 | 7/2003 | Ricchetti et al. | |
| 2004/0230729 A1 | 11/2004 | Ho et al. | |
| 2005/0021949 A1 | 1/2005 | Izawa et al. | |
| 2005/0102244 A1 | 5/2005 | Dickinson et al. | |
| 2005/0120218 A1 | 6/2005 | Echizen et al. | |
| 2007/0113230 A1 | 5/2007 | Bourdon et al. | |
| 2007/0245141 A1 | 10/2007 | O'Keefe et al. | |

OTHER PUBLICATIONS

Supplementary European Search Report for European Application No. EP06786509 dated Dec. 16, 2009, 5 pages.

Extended Search Report mailed on May 27, 2011 for EP Patent Application No. EP 06786507, 7 pages.

International Search Report and Written Opinion for PCT/US2006/026374 mailed on Apr. 1, 2008, 4 pages.

International Search Report and Written Opinion for PCT/US2006/026376 mailed on Feb. 4, 2008, 7 pages.

Non-Final Office Action of Aug. 15, 2011 for U.S. Appl. No. 11/428,505, 12 pages.

Notice of Allowance of May 18, 2010 for U.S. Appl. No. 11/428,516, 8 pages.

Advisory Action of Mar. 8, 2010 for U.S. Appl. No. 11/428,505, 3 pages.

Non-Final Office Action of Dec. 16, 2009 for U.S. Appl. No. 11/428,505, 12 pages.

Non-Final Office Action of Nov. 20, 2009 for U.S. Appl. No. 11/428,516, 25 pages.

Non-Final Office Action of May 29, 2009 for U.S. Appl. No. 11/428,505, 11 pages.

Non-Final Office Action of Nov. 19, 2008 for U.S. Appl. No. 11/428,516, 23 pages.

Non-Final Office Action of Nov. 17, 2008 for U.S. Appl. No. 11/428,505, 9 pages.

Examiner Interview Summary of Aug. 21, 2008 for U.S. Appl. No. 11/428,516, 4 pages.

Non-Final Office Action of May 13, 2008 for U.S. Appl. No. 11/428,516, 22 pages.

Notice of Allowance of Jan. 31, 2012 for U.S. Appl. No. 11/428,505, 17 pages.

* cited by examiner

SYSTEM FOR SELECTIVELY SYNCHRONIZING HIGH-ASSURANCE SOFTWARE TASKS ON MULTIPLE PROCESSORS AT A SOFTWARE ROUTINE LEVEL

This application claims the benefit of and is a non-provisional of both U.S. Provisional Application Ser. No. 60/697,072 filed on Jul. 5, 2005; and U.S. Provisional Application Ser. No. 60/697,071 filed on Jul. 5, 2005, which are both assigned to the assigner hereof and hereby expressly incorporated by reference in their entireties for all purposes.

This application is related to all of U.S. patent application Ser. No. 11/428,520, filed Jul. 3, 2006, entitled "TRUSTED CRYPTOGRAPHIC SWITCH"; U.S. patent application Ser. No. 11/428,505, filed Jul. 3, 2006, entitled "TRUSTED CRYPTOGRAPHIC PROCESSOR"; and U.S. patent application Ser. No. 11/428,516, filed Jul. 3, 2006, entitled "SYNCHRONIZED HIGH-ASSURANCE CIRCUITS"; which are all assigned to the assigner hereof and hereby expressly incorporated by reference in their entirety for all purposes.

BACKGROUND

This disclosure relates in general to high-assurance processing and, but not by way of limitation, to redundant circuits used in cryptographic processing.

Some cryptosystems today use microprocessors. Often redundancy is used to assure proper operation of the cryptosystem. Microprocessors may be implemented redundantly. To assure they operate in synchronization, the microprocessors may be run in lock-step fashion such that they perform their execution in unison. Should one processor vary its operation from the other, a comparison function would find the problem.

Under many circumstances, the same processors working in unison will eventually drift apart. Power conservation circuits can throttle-back sub-circuits to save power and/or prevent overheating. Interrupts can often be received asynchronously. Out-of-order execution can also cause unpredictability in the processing flow of microprocessors. These and other factors make some microprocessor designs unsuitable for lock-step operation.

Lock-step designs require circuits that match very closely to prevent one from getting out of synchronization with another. Synchronizers are used to align events that occur at different times. Where circuits cannot be matched or are changed during repair, the lock-step design may no longer operate in synchronization.

For lock-step operation, the software on all mirrored microprocessors must execute together, which requires the same software execution on the microprocessors. Some software tasks are appropriate for lock-step operation, while others do not require that level of harmonization. Redundant execution of all software wastes resources on routines that have no need for harmonization.

SUMMARY

In one embodiment, the present disclosure provides a task matching circuit for synchronizing software on a plurality of processors is disclosed. The task matching circuit includes first and second inputs, an analysis sub-circuit, and an output. The first input is from a first processor configured to receive a first software routine identifier. The second input is from a second processor configured to receive a second software routine identifier. The analysis sub-circuit determines if the first software routine identifier corresponds with the second software routine identifier. The output is coupled to at least one of the first or second processors and indicates when the first and second software routine identifiers do not correspond. One of the first and second processors is delayed until the first and second software routine identifiers correspond.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1A:
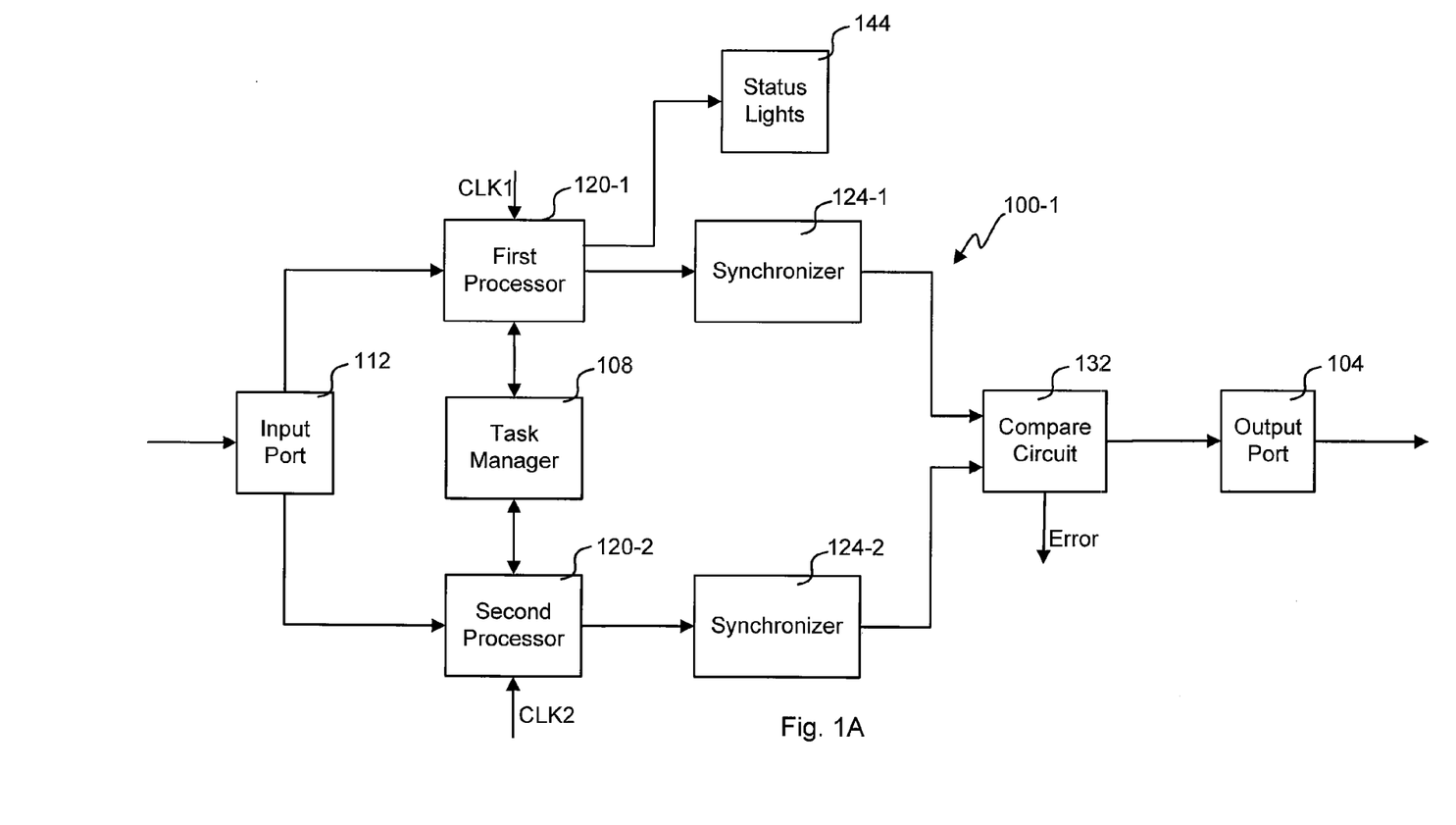
FIGS. 1A and 1B depict block diagrams of embodiments of a redundant processing system.

Referring first to FIG. 1A, a block diagram of an embodiment of a redundant processing system 100-1 is shown. This embodiment uses two processors 120 that synchronize on occasion for high-assurance tasks, but may be out of synchronization at other times when other tasks are being performed. The block diagram is simplified in that only a few blocks are shown that demonstrate high-assurance tasks and a low-assurance task. A task is any discrete function, routine, snippet, applet, program, or process that can be implemented in software and/or hardware. In this example, servicing the input and output ports is high-assurance, but operating status lights is low-assurance. When performing high-assurance tasks, redundant processing is performed where the results are compared to assure a match. Even though this embodiment only shows two redundant sub-circuits, other embodiments could have any number of redundant sub-circuits, e.g., four, six, eight, etc.

High-assurance tasks include servicing an input and output ports 112, 104. The input port 112 receives information that is redundantly sent to a first processor 120-1 and a second processor 120-2 for processing. The processing could include formatting, validity checks, cryptographic processing, etc. The processors 120 could be of the same or a similar configuration. In this embodiment, the clocks for the processors 120 are not synchronized and could run at different speeds. For example, the first processor 120 could run faster or more efficiently to allow for extra low-assurance tasks to be serviced such as servicing the status lights 144. When running the same high-assurance tasks, the processors 120 could disable further interrupts to avoid one or both processors 120 from wandering away from the current task and risking a loss of synchronization.

A task manager 108 is used in this embodiment to allow coordinating pursuit of high-assurance tasks by ensuring that each processor performs the shared high-assurance tasks in the same order. These processors may have other tasks interspersed between the shared tasks. One of the processors 120 initiates a high-assurance task and notifies the task manager 108 which makes sure the other processor 120 is ready to initiate the same high-assurance task. When both processors 120 are ready, the task manager 108 notifies both to begin execution.

An example can illustrate the task synchronization process. A message is received on the input port and both processors 120 are interrupted to gather and process the message. The first processor 120-1 to execute its interrupt service routine (ISR) would get to the point of notifying the task manager 108. Presumably, the other processor 120-2 is getting to a similar point in its respective ISR. The task manager 108 would hold the first processor 120-1 to wait for the second processor 120-2. The second processor 120-2 could be prompted by the task manager 108 to cycle through all potential tasks until the one indicated by the first processor 120-1 matches. The task manager 108 would coordinate both processors 120 in beginning to execute the same task. Although this embodiment does not require lock-step processing of high-assurance tasks, other embodiments could use lock-step processing when executing high-assurance tasks.

Although the task manager should assure that both processors 120 work the same task in the same order, the results can be out of time synchronization. Synchronizers 124-1, 124-2 in this embodiment can realign the output from each processor and/or reduce the risk of metastability when going from one clock domain to another. In one embodiment, the synchronizer 124 for each processor 120 produces results in synchronization by buffering results from the processor and aligning those results or forgiving any misalignment. In one embodiment, the task manager 108 could allow the processors 120 coordinate writing out information such that alignment issues are reduced. This embodiment of the synchronizer would still reduce the risk of metastability when crossing clock domains.

The compare circuit 132 checks that the results produced after synchronization match before sending a result to the output port 104. Where there is no match an error is produced and the result is not sent to the output port 104. Some embodiments of the compare circuit 132 may allow the results from each synchronizer 124 to be one or more clock cycles out of sync when performing the comparison without producing a error.

Figure 1B:
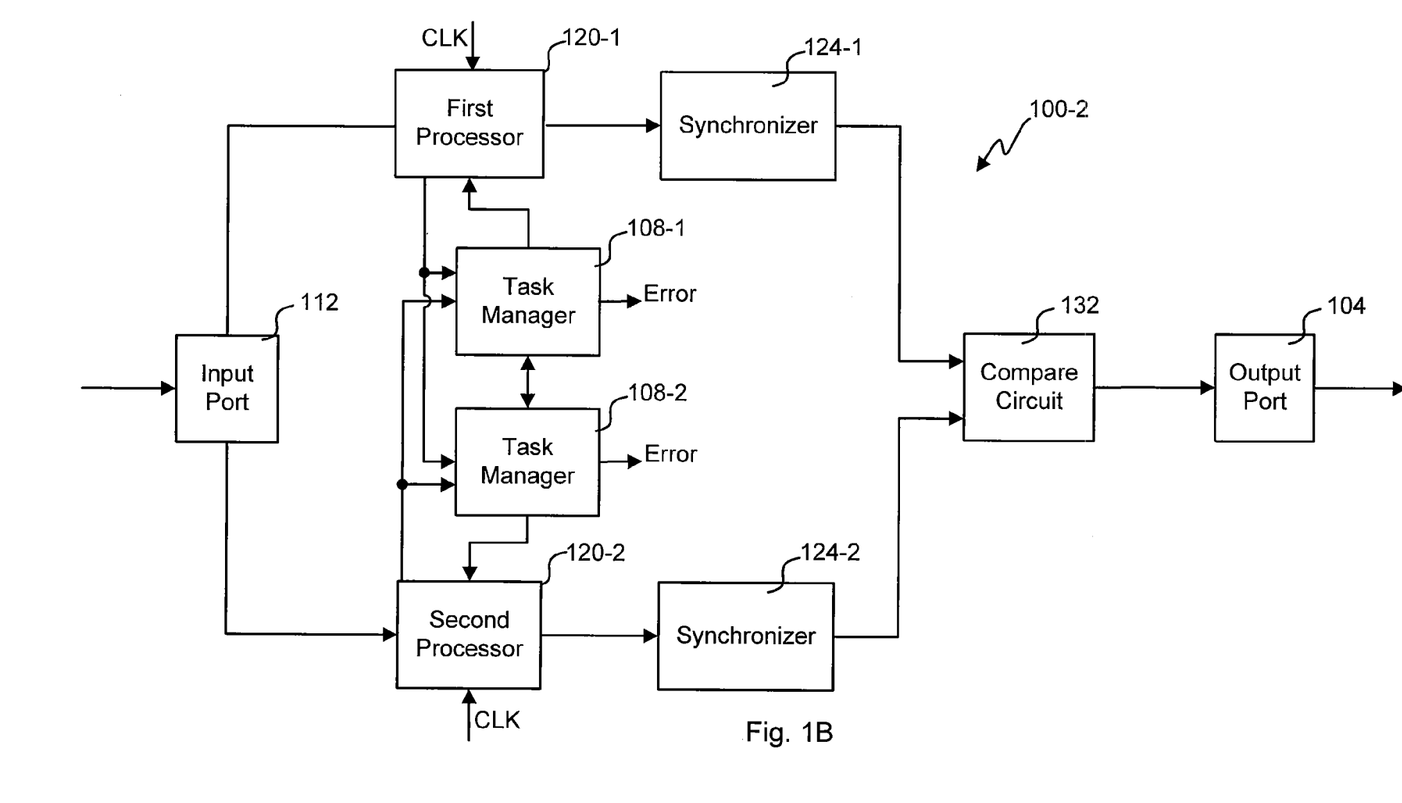

With reference to FIG. 1B, a block diagram of another embodiment of a redundant processing system 100-2 is shown. This embodiment has two task managers 108 that are used to achieve redundancy in the task management function. Each processor 120 responds to its respective task manager 108-1, 108-2, who then coordinate aligning the task execution. In this embodiment, the two processors 120 could be different designs or clocked at different frequencies such that lock-step synchronization is not realized. The task managers 108 keep the processors 120 task aligned for some high-assurance tasks despite any differences in the processors 120. Should the task managers 108 disagree at some point, an error would be produced. Comparison circuits could, for example, be used to check the output of the task managers 108. The synchronized task output comparator 132 acts as in FIG. 1A.

Figure 2A:
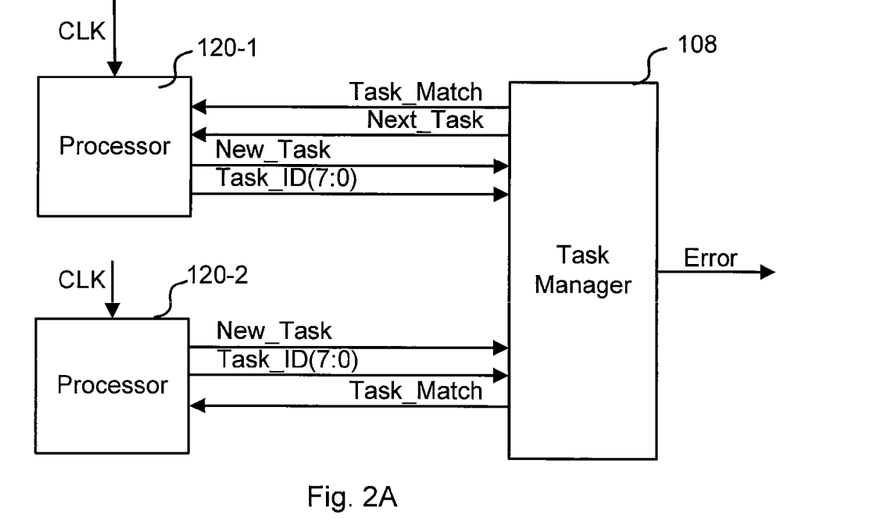
FIGS. 2A, 2B and 2C depict block diagrams of embodiments of a task management circuit interacting with two processors.

Referring next to FIG. 2A, a block diagram of an embodiment of a task management circuit 108 interacting with two processors 120 is shown. Only a single task manager 108 is used in this embodiment, but other embodiments could use redundant task managers. In this embodiment, the second processor 120-2 initiates task synchronizations as a master of the process and the first processor 120-1 acts as a slave.

For a high-assurance task, the second processor 120-2 activates the New_Task signal. The task manager 108 reads the Task_ID value from the second processor 120-2. Activation of the New_Task signal and writing the Task_ID is coded into the task routine run on the second processor 120-2. This embodiment uses an eight bit value to indicate the task identifier, but other embodiments could use a 16-bit, 32-bit value or any other sized value. The Task_ID is unique to a particular high-assurance task run on both processors 120.

With the Task_ID, the task manager 108 activates the Next_Task signal to ask the first processor 120-1 to indicate the next task queued for execution. The first processor activates its New_Task signal to indicate validity of a Task_ID. Where there is no match of both Task_IDs, the task manager 108 asks the first processor to move to the next task by activation of the Next_Task signal. Should the two Task_IDs match or correspond, however, the Task_Match signals are activated. This would signal to both processors 120 to begin to execute the same task indicated by the Task_IDs. If no task match is produced within a pre-determined time or number of trials, the processor would discard that task from its queue and continue in one embodiment.

Figure 2B:
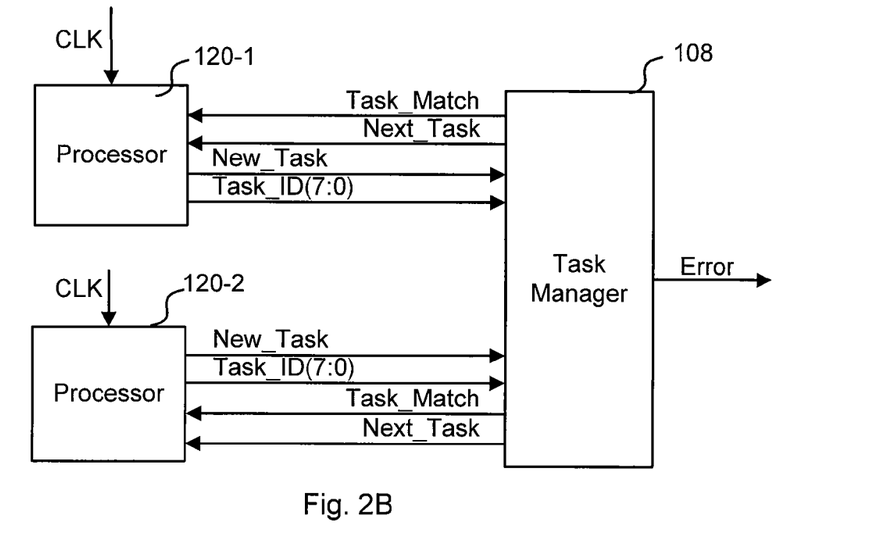

With reference to FIG. 2B, a block diagram of another embodiment of a task management circuit 108 interacting with two processors 120 is shown. In this embodiment, either processor can initiate a task synchronization. The first to initiate would act as the master of the process and the other processor would act as the slave. The task manager 108 would work with the master processor 120 until matching tasks are found and executed before allowing another initiation of the task matching process. Alternative embodiments could redundantly implement the task manager 108 and still allow dynamically assigning the master of the process. Disagreement between redundant task managers 108 would be recognized as an error.

Figure 2C:
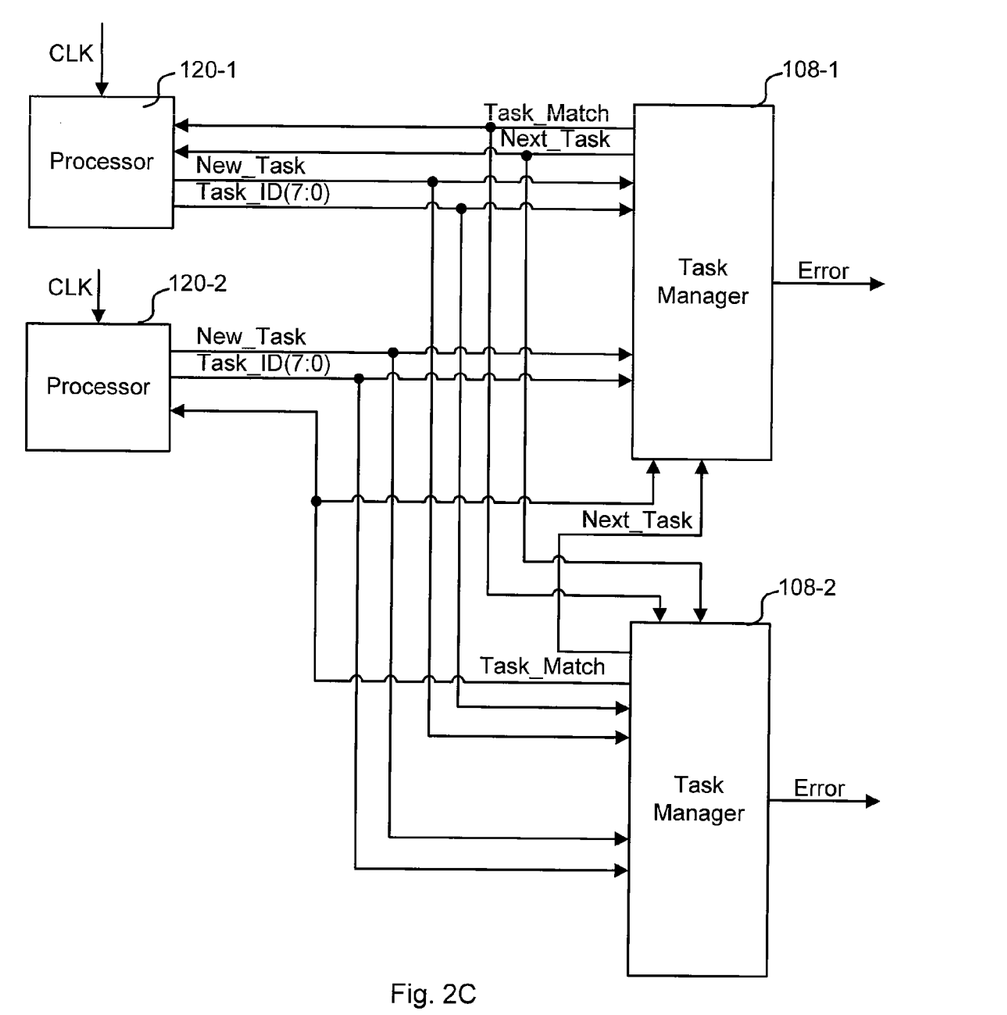

With reference to FIG. 2C, a block diagram of an embodiment of redundant task management circuits 108 interacting with two processors 120 is shown. This embodiment utilizes redundancy in the task management circuits 108 to provide high-assurance. Both task management circuits 108 compare tasks and report task incrementing and matching tasks to each other. Where the two task managers 108 are not in agreement, an error is generated. In the depicted embodiment, second processor 120-2 acts as a master and the first processor acts as a slave in the process of synchronizing execution of a high-assurance task. The first processor is directly manipulated by the first task manager 108-1, and the second processor is directly manipulated the second task manager 108-2.

Figure 3:
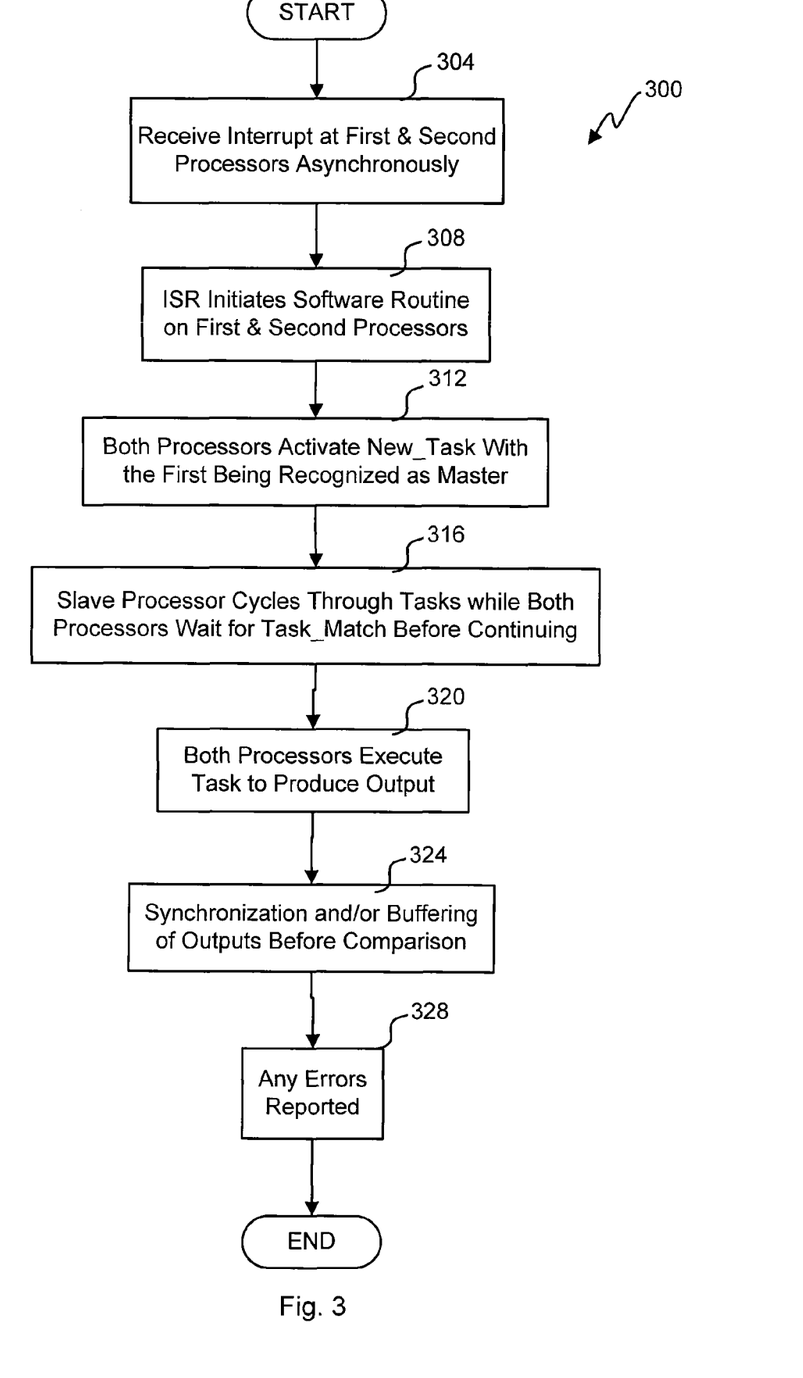
FIG. 3 illustrates a flowchart of an embodiment of a process for aligning processing of some tasks on two circuits.

Referring next to FIG. 3, a flowchart of an embodiment of a process 300 for aligning processing of some tasks on two circuits is shown. The depicted portion of the process begins in block 304 where the first and second processors 120 receive an interrupt to perform some sort of high-assurance task. Alternatively, the processors 120 could poll a register to determine when a high-assurance task should be initiated. An ISR indicated by the interrupts is started on both processors 120. The two processors 120 may start processing the interrupts at different times in block 308. Further, processing could be rearranged or interrupted such that both processors 120 are not performing the same actions at the same time.

In this embodiment, both processors could potentially be the master initiating the task matching process, but only one is allowed to master the process. Where both activate their respective New_Task lines simultaneously, the task manager 108 could arbitrarily, randomly or repeatedly pick one of the two to be the master. In block 312, one or both processors 120 activate the New_Task line and one is recognized as master. In block 316, the slave processor 120 is tested to determine if the Task_ID matches with the master processor 120. Where there is no match, the slave processor cycles through tasks as Next_Task is activated successively. At some point in block 316, Task_Match goes active to indicate that both processors 120 have the same Task_ID at the top of their execution queue.

With matching Task_IDs, Task_Match signals to both processors that they should start execution of the high-assurance task in block 320 and produce an output of some sort. The operation of the processors 120 may or may not be in lock-step during execution of the high-assurance task. Some, all or low-priority interrupts may be disabled during execution of the high-assurance task to control the interrupts tolerated. Synchronization and/or buffering may or may not be done on the output before comparing the outputs from both processors 120 in block 324. Any errors are handled and reported in block 328.

Figure 4A:
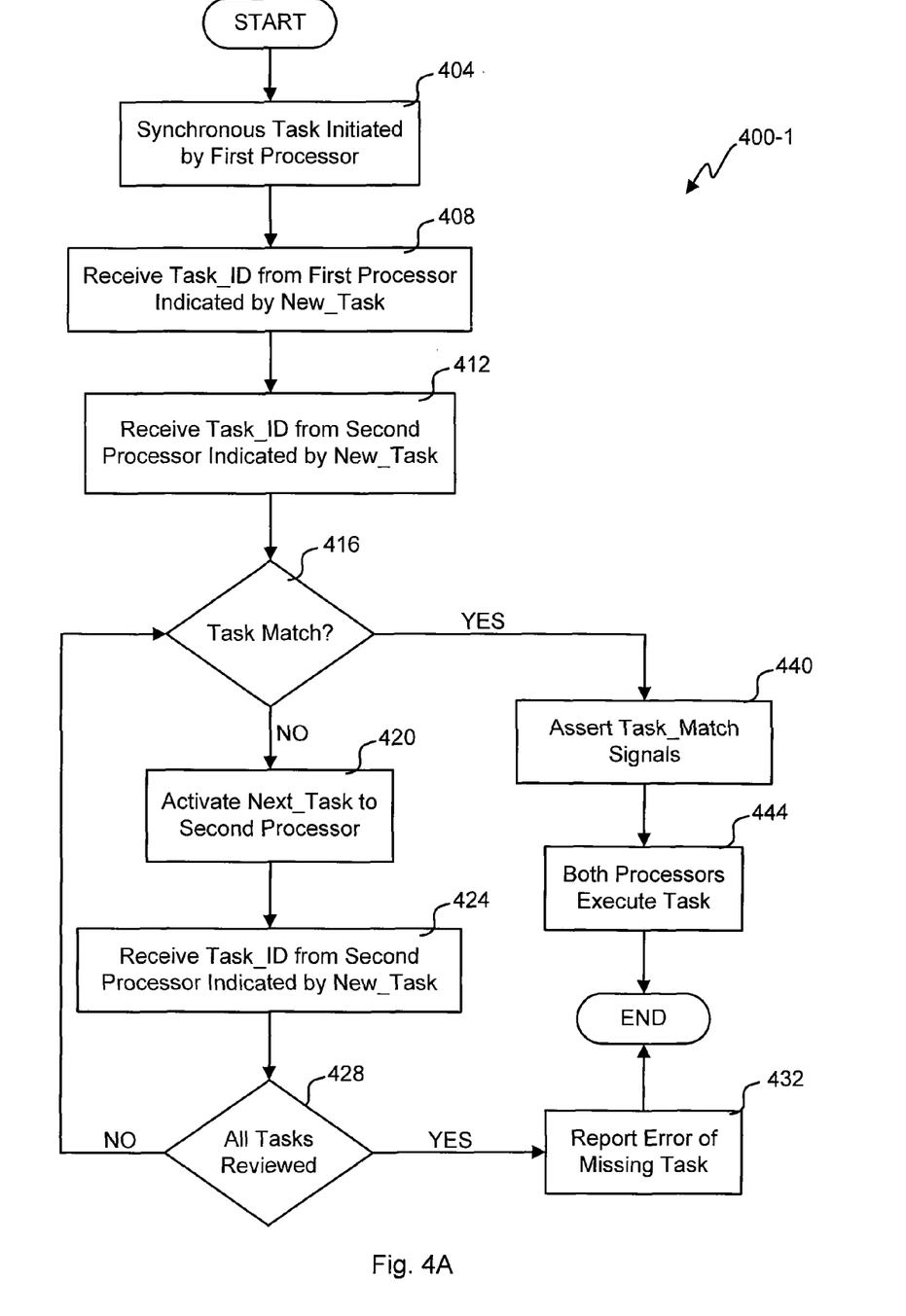
FIGS. 4A and 4B illustrate flowcharts of embodiments of a process for managing task alignment for two circuits.

With reference to FIG. 4A, a flowchart of an embodiment of a process 400-1 for managing task alignment for two circuits is shown. The circuits may be state machine driven or processor driven, but in this embodiment both circuits use processors. The depicted portion of the process begins in step 404 where a synchronous or high-assurance task is initiated by a first processor 120. The task manager 108 is told by the first processor's activation of the New_Task line to observe the Task_ID value in block 408. The identification of the task from the second processor is received in block 412. In one embodiment, the New_Task line serves to latch the Task_ID into a register of the task manager 108. If operating correctly, both processors have the task ready to execute, but on the second processor, the task may not be at the top of the queue.

A test in block 416 determines if the Task_IDs for both processors match. In some embodiments this could be an exact match or just that they correspond. For example, one embodiment may use hexadecimal number for one processor's Task_ID and ASCII for the other processor's Task_ID. The task manager 108 would know how to correspond or translate one to the other. Where the Task_IDs correspond, the Task_Match signal is asserted by the task manager 108 and fed to both processors in block 440. Both processors 120 execute the task in block 444 to produce some output or result. The processors 120 may or may not act in lock-step.

Should the tasks not match in block 416, the second processor rotates through its tasks until they do correspond. In block 420, the Next_Task signal is activated by the task manager 108. This signal tells the second processor to present the Task_ID for another task. The second processor may randomly, sequentially or use some other scheme to present the next task for a possible match. This embodiment presents tasks thought to be high-assurance first before presenting low-assurance tasks for a possible match. The next Task_ID for the second processor 120 is received by the task manager 108 in block 424.

In block 428, a determination is made to see if all tasks have been presented. This could be done by waiting for the same task to be presented again, by a signal from the processor, or a time delay that would permit review of all tasks. Where all have been reviewed and a match wasn't found, processing goes from block 428 to block 432 where an error is reported. If all the tasks have not been reviewed in block 428, processing loops back to block 416 to determine if there is a match before further processing as described above.

Figure 4B:
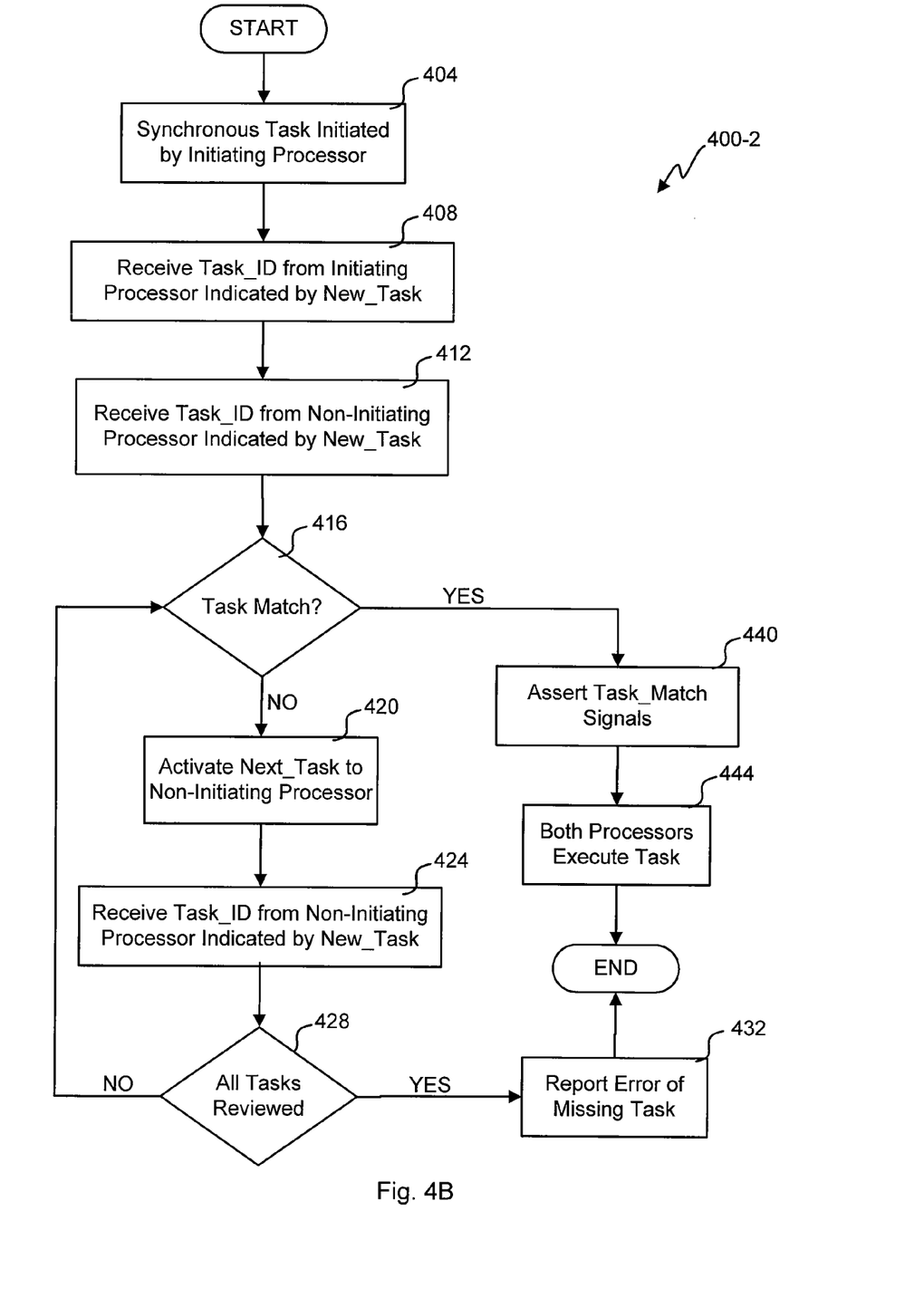

With reference to FIG. 4B, a flowchart of another embodiment of a process 400-2 for managing task alignment for two circuits is shown. In this embodiment, both processors 120 can initiate a task check. The initiating processor masters the process and the non-initiating processor is a slave in the process. The first processor to identify the high-assurance task and activate the New_Task becomes the initiating processor. The initiating processor could be chosen in other ways in other embodiments.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other mediums capable of storing, containing or carrying instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

For a software implementation, the techniques, processes and functions described herein may be implemented with modules (e.g., procedures, functions, and so on) that perform the functions described herein. The software codes may be stored in memory units and executed by processors. The memory unit may be implemented within the processor or external to the processor, in which case the memory unit can be communicatively coupled to the processor using various known techniques.

While the principles of the disclosure have been described above in connection with specific apparatuses and methods, it is to be clearly understood that this description is made only by way of example and not as limitation on the scope of the disclosure.

What is claimed is:

1. A task matching circuit for synchronizing software on a plurality of processors, the task matching circuit comprising:
    a first input from a first processor configured to receive a first software routine identifier, wherein one value of the first software routine identifier uniquely identifies, based on the one value of the first software routine identifier, a first routine to be executed by the first processor, the first routine being one of a plurality of routines and comprising a predetermined plurality of software instructions;
    a second input from a second processor configured to receive a plurality of second software routine identifiers from a queue of second software routine identifiers, wherein:
        each of the plurality of second software routine identifiers uniquely identifies a corresponding one of a plurality of second routines to be executed by the second processor, and
        each of the second routines is one of the plurality of routines and comprises a predetermined plurality of software instructions;
    an analysis sub-circuit, at least partially embodied in hardware, configured to compare the first software routine identifier with each of the plurality of second software routine identifiers and determine if the first software routine identifier and a presently compared one of the second software routine identifiers correspond to a same routine; and
    an output coupled to at least one of the first or second processors, wherein:
        the output indicates when the first software routine identifier and one of the plurality of second software routine identifiers do not correspond to the same routine, and
        the analysis sub-circuit is configured to delay the first processor, and select each of the plurality of second software routine identifiers in the queue of second software routine identifiers, without the second processor executing a second routine corresponding to a presently selected second software routine identifier, until the first software routine identifier and the presently selected second software routine identifier correspond to the same routine.

2. The task matching circuit for synchronizing software on the plurality of processors as recited in claim 1, wherein the analysis sub-circuit is configured to cause the first processor to perform more software routines than the second processor during normal operation.

3. The task matching circuit for synchronizing software on the plurality of processors as recited in claim 1, wherein the analysis sub-circuit is configured to receive an initiation message from the first processor, and initiate a task check process to synchronize the first and second processors in executing the first routine.

4. The task matching circuit for synchronizing software on the plurality of processors as recited in claim 1, wherein the output indicates that the first software routine identifier and the presently selected second software routine identifier correspond to the same routine only when the second software routine produces a result that the first software routine also produces.

5. The task matching circuit for synchronizing software on the plurality of processors as recited in claim 1, wherein the analysis sub-circuit is configured to delay at least one of the first and second processors from executing a software routine corresponding to one of the first software routine identifier and the presently selected second software routine identifier until the output indicates that the first and second software routine identifiers correspond to the same routine.

6. The task matching circuit for synchronizing software on the plurality of processors as recited in claim 1, further comprising the first processor and the second processor wherein the first processor operates off a first clock signal different from a second clock signal of the second processor.

7. The task matching circuit for synchronizing software on the plurality of processors as recited in claim 1, wherein the first processor cannot communicate directly with the second processor.

8. The task matching circuit for synchronizing software on the plurality of processors as recited in claim 1, wherein the first software routine identifier is created from contents of the first routine.

9. The task matching circuit for synchronizing software on the plurality of processors as recited in claim 1, wherein the first processor is a different design from the second processor.

10. The task matching circuit for synchronizing software on the plurality of processors as recited in claim 1, wherein the first processor and the second processor execute the same routine, at least partially simultaneously in time.

11. The task matching circuit for synchronizing software on the plurality of processors as recited in claim 1, wherein the analysis sub-circuit is configured to determine, for a subset of a plurality of software routine identifiers, that the first software routine identifier and the presently selected second software routine identifiers correspond, and the analysis sub-circuit does not delay the first processor unless at least one of the first software routine identifier and the presently selected second software routine identifier is one of the subset.

12. A high-assurance circuit for coordinating performance on a plurality of sub-circuits, the high-assurance circuit comprising:

a first input from a first sub-circuit configured to receive a first operation identifier, wherein one value of the first operation identifier uniquely identifies, based on the one value of the first operation identifier, a first software operation comprising a predetermined plurality of software instructions to be executed by the first sub-circuit, the first software operation being one of a plurality of software operations;

a second input from a second sub-circuit configured to receive a plurality of second operation identifiers from a queue of second operation identifiers, wherein:
  each of the plurality of second operation identifiers uniquely identifies a corresponding one of a plurality of second software operations to be executed by the second sub-circuit, and
  each of the second software operations comprises a predetermined plurality of software instructions;

an analysis sub-circuit, at least partially embodied in hardware, configured to compare the first operation identifier with each of the plurality of second operation identifiers and determine if the first operation identifier corresponds with a presently compared one of the second operation identifiers; and an output coupled to at least one of the first or second sub-circuits, wherein:
  the output indicates when the first operation identifier and one of the plurality of second operation identifiers do not correspond to functionally overlapping software operations, and
  the analysis sub-circuit is configured to delay the first sub-circuit, and select each of the plurality of second operation identifiers in the queue of second operation identifiers, without the second sub-circuit executing a second software operation corresponding to a presently selected second operation identifier, until the first operation identifier and the presently selected second operation identifier correspond to functionally overlapping software operations.

13. The high-assurance circuit for coordinating performance on the plurality of sub-circuits as recited in claim 12, wherein the analysis sub-circuit is configured to cause the first sub-circuit to perform more functions than the second sub-circuit during normal operation.

14. The high-assurance circuit for coordinating performance on the plurality of sub-circuits as recited in claim 12, further comprising the first sub-circuit wherein the first sub-circuit is integral to a processor.

15. The high-assurance circuit for coordinating performance on the plurality of sub-circuits as recited in claim 14, further comprising the second sub-circuit wherein the second sub-circuit comprises a processor.

16. The high-assurance circuit for coordinating performance on the plurality of sub-circuits as recited in claim 15, wherein the first sub-circuit operates off a first clock signal different from a second clock signal of the second sub-circuit.

17. The high-assurance circuit for coordinating performance on the plurality of sub-circuits as recited in claim 12, wherein functionally overlapping operations produce at least one result in common when given a same set of inputs corresponding to the at least one result.

18. The high-assurance circuit for coordinating performance on the plurality of sub-circuits as recited in claim 12, wherein the analysis sub-circuit is configured to delay at least one of the first and second sub-circuits from executing a software operation corresponding to the first operation identifier and the presently selected second operation identifier until the output indicates that the first operation identifier and the presently selected second operation identifier correspond.

19. The high-assurance circuit for coordinating performance on the plurality of sub-circuits as recited in claim 12, wherein the analysis sub-circuit is configured to determine, for a subset of a plurality of operation identifiers, that the first and second operation identifiers correspond, and the analysis sub-circuit does not delay the first sub-circuit unless at least one of the first operation identifier and the presently selected second operation identifier is one of the subset.

* * * * *